United States Patent
Turner (10) Patent No.: US 12,400,361 B2
(45) Date of Patent: Aug. 26, 2025

(54) VEHICLE CONTROL SYSTEM AND METHOD

(71) Applicant: JAGUAR LAND ROVER LIMITED, Warwickshire (GB)

(72) Inventor: James Turner, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 547 days.

(21) Appl. No.: 17/613,295

(22) PCT Filed: May 22, 2020

(86) PCT No.: PCT/EP2020/064252
§ 371 (c)(1),
(2) Date: Nov. 22, 2021

(87) PCT Pub. No.: WO2020/234440
PCT Pub. Date: Nov. 26, 2020

(65) Prior Publication Data
US 2022/0222850 A1     Jul. 14, 2022

(30) Foreign Application Priority Data
May 23, 2019   (GB) ...................................... 1907297

(51) Int. Cl.
*G06T 7/73*     (2017.01)
*B62D 15/02*     (2006.01)
*G06V 20/56*     (2022.01)

(52) U.S. Cl.
CPC ............... *G06T 7/74* (2017.01); *G06V 20/56* (2022.01); *B62D 15/029* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 4,428,342 | A * | 1/1984 | Suzuki | F02P 5/1455 |
| | | | | 123/406.23 |
| 2009/0179773 | A1 | 7/2009 | Denny et al. | |

(Continued)

FOREIGN PATENT DOCUMENTS

| | | |
|---|---|---|
| CN | 104590372 A | 5/2015 |
| DE | 102008045436 A1 | 3/2010 |

(Continued)

OTHER PUBLICATIONS

J.-D. Lee, Y.-S. Chen and J.-C. Chien, "Classification and tracking of large vehicles for night driving," 2016 IEEE 5th Global Conference on Consumer Electronics, Kyoto, Japan, 2016, pp. 1-2, doi: 10.1109/GCCE.2016.7800320. (Year: 2016).*

(Continued)

*Primary Examiner* — Vincent Rudolph
*Assistant Examiner* — Meredith Taylor
(74) *Attorney, Agent, or Firm* — Carlson, Gaskey & Olds, P.C.

(57) ABSTRACT

Aspects of the present invention relate to a control system (2) for monitoring a movement of a trailer (3) connected to a vehicle (1). The control system comprises one or more controllers (5) and is configured to: receive image data from an image sensor (10) disposed on the vehicle; store image data corresponding to a central reference image, a current reference image and a current frame and associate an offset angle with the current reference image, and associate a correction angle with current reference image. The control system (2) is configured to compare the current reference image to the current frame to determine a change angle; determine a hitch angle in dependence on the offset angle, the change angle and the correction angle; and output the hitch angle.

16 Claims, 7 Drawing Sheets

(56) References Cited

U.S. PATENT DOCUMENTS

| | | |
|---|---|---|
| 2014/0085472 A1 | 3/2014 | Lu et al. |
| 2014/0152825 A1 | 6/2014 | Schaffner |
| 2016/0049020 A1 | 2/2016 | Kuehnle et al. |
| 2016/0234436 A1 | 8/2016 | Yu et al. |
| 2018/0276839 A1* | 9/2018 | Diessner ............... G06T 7/73 |
| 2019/0071088 A1 | 3/2019 | Hu et al. |

FOREIGN PATENT DOCUMENTS

| | | |
|---|---|---|
| DE | 102011104256 A1 | 7/2012 |
| JP | 2018176788 A | 11/2018 |
| WO | 2012/103193 A1 | 8/2012 |

OTHER PUBLICATIONS

Wang, Yafei, et al. "Vision-based vehicle body slip angle estimation with multi-rate Kalman filter considering time delay." 2012 IEEE International Symposium on Industrial Electronics. IEEE, 2012. (Year: 2012).*

Notice of First Examination Opinion, CN Application No. 202080044413.3 dated Apr. 29, 2023.

Combined Search and Examination Report under Sections 17 and 18(3) for Application No. GB1907297.4 dated Nov. 25, 2019.

International Search Report and Written Opinion of the International Searching Authority for International application No. PCT/EP2020/064252 dated Aug. 12, 2020.

* cited by examiner

VEHICLE CONTROL SYSTEM AND METHOD

TECHNICAL FIELD

The present disclosure relates to a control system and method and particularly, but not exclusively, to a system and a method for monitoring a movement of a trailer connected to a vehicle. Aspects of the invention relate to a control system, to a control method, and to a vehicle.

BACKGROUND

It is known to use an imaging sensor to track movements of a trailer connected to a vehicle. In order to accurately to track the trailer, prior art systems require that a target is mounted to the front of the trailer. The target can, for example, take the form of three circles arranged in a triangular configuration. An optical camera mounted to the vehicle identifies the target and tracks its movement relative to the vehicle. There are certain shortcomings associated with these prior art systems, notably the requirement that the target is fitted to the trailer. The initial setup of the trailer tracking system can be time-consuming. In order to track the trailer, the target must be installed in a specified location on the trailer, but this may not be possible depending on the configuration of the trailer.

It is an aim of the present invention to address one or more of the disadvantages associated with the prior art.

SUMMARY OF THE INVENTION

Aspects and embodiments of the invention provide a control system, a method of monitoring a movement of a trailer connected to a vehicle, and a vehicle as claimed in the appended claims.

According to an aspect of the present invention there is provided a control system for monitoring a movement of a trailer connected to a vehicle, the control system comprising one or more controllers, the control system being configured to: receive image data from an image sensor disposed on the vehicle; store image data corresponding to a central reference image, a current reference image and a current frame; associate an offset angle with the current reference image, and associate a correction angle with the current reference image; compare the current reference image to the current frame to determine a change angle; determine a hitch angle in dependence on the offset angle, the change angle and the correction angle; and output a signal indicative of the hitch angle.

In this way, this control system provides a means to track a trailer without using a target mountable on a trailer and avoid the limitation of having to secure the target in a certain manner so that it can be used by the system in a consistent way. The control system is capable of providing a signal indicative of the hitch angle that is accurate and robust. By obtaining the hitch angle in dependence on the offset angle, the change angle and the correction angle, the control system provides a means to check and correct the identified hitch angle of the trailer whilst mitigating the risk of introducing inaccuracy.

The one or more controllers collectively comprise at least one electronic processor having an input for receiving image data; and at least one memory device electrically coupled to the at least one electronic processor and having instructions stored therein; and wherein the at least one electronic processor is configured to access the at least one memory device and execute the instructions. More than one electronic processor may be used. The processors may have different capabilities. Each of the processors may be used to calculate different angles. For example, when compared amongst the processors, a processor with slower processing speed may be used to calculate the correction angle and a processor with faster processing speed may be used to calculate the offset angle. The processing speed may be dependent on the physical capability of the processors. Alternatively or in addition, the processing speed may be controlled by the control system so that the angles may be processed at different speed.

The control system may be configured to determine the correction angle by comparing the central reference image to the current reference image to determine a reference angle and calculating the difference between the reference angle and the offset angle. In this way, the correction angle may be used to provide an additional value in obtaining more robust hitch angle. The use of the difference between the reference angle and the offset angle rather than just substituting with the offset angle provides the effect of smoothing the transition. Furthermore, when the trailer is hitched at a high angle, a significant erroneous value may be introduced by an image processing technique. The use of the difference between the reference angle and the offset angle prevents this type of error from causing an undesired effect on subsequent frames and allows the tracking to recover from an error in the correction angle.

The control system may be configured to perform an initial calibration to determine the central reference image. In this way, the central reference image may vary depending on the type of a trailer being attached and on the type of connector and hitch coupling. It is then possible to use the control system with different type of the trailer. Furthermore, the calibration at the beginning of the journey can eliminate introduction of a potential mis-calculation in the system.

The current reference image may be replaced with the current frame when the change angle reaches a predetermined threshold. The predetermined threshold may be +/−3 degrees. This ensures that the current reference image is updated accordingly in dependence on the trailer orientation. The trailer orientation here refers to the trailer's position relative to the vehicle. For example, the orientation of the trailer may be determined in dependence on the movement of the trailer about a longitudinal axis X (rotational angle), a transverse axis Y (pitch angle), and vertical axis Z (hitch angle) of the trailer.

The offset angle may be replaced by the sum of the change angle of the current frame to the current offset angle. In this way the offset angle is updated accordingly in dependence on the trailer orientation relative to the vehicle.

The control system may be configured to determine the change angle at a first predetermined interval and the correction angle at a second predetermined interval. The first predetermined interval may be shorter than the second predetermined interval. The first predetermined interval may be 30 ms. The second predetermined interval may be half a second. In this way, the determination of the change angle and the correction angle may occur at different intervals. This ensures that an error correction occurs at a relevant time interval saving overall processing power of the system and reducing unnecessary processing. This also ensures that the control system provides opportunities to obtain a more accurate determination of the hitch angle, using the correction angle, by providing a means to calculate the relevant angles with more accurate, yet time consuming, image processing technique to derive the hitch angle.

The control system may be configured to determine the correction angle when the current reference image is replaced. If the correction angle exceeds a predetermined maximum value, the control system may be configured to add a partial correction angle less than or equal to the predetermined maximum value at each of the first predetermined interval until the total correction angle is added. The predetermined maximum value may be 1.5 degree. In this way, the correction of the image can be smoother and a consistent feedback to the user can be provided. The total correction angle may be capped at +/−40 degrees. This capping ensures the quick recovery of the system from a major error without compromising the performance of the control system during a normal situation (when such major error does not occur).

Known computer vision algorithms for selecting and/or for comparing sets of features from the images to determine the change angle, the offset angle and the correction angle are different. Computer vision algorithms such as Features from Accelerated Segment Test (FAST), Binary Robust Independent Elementary Features (BRIEF), KAZE and their variants may be used for finding and identifying notable features within a frame. Fast Library for Approximate Nearest Neighbours (FLANN) algorithm is then used to match the notable features identified in a pair of frames, and a transformation calculated from the two sets of identified features to determine the relative angle of rotation between the two frames. Different algorithms may process the data at different speed and with different accuracies. All these various angle values are consolidated to provide a more accurate determination of required angles. This also enables that the control system can be designed in a more flexible manner, in different arrangements and satisfying various requirements.

The control system may be configured to: select a first set of features from the current reference image, a second set of features from the current frame, a third set of features from the central reference image; determine the change angle by comparing the first set of features and the second set of features; and determine the correction angle by comparing the first set of features and the third set of features.

According to a further aspect of the invention, there is provided a method of monitoring a movement of a trailer connected to a vehicle, the control method comprising: receiving image data from an image sensor disposed on the vehicle; storing image data corresponding to a central reference image, a current reference image and a current frame; associating an offset angle with the current reference image, and associating a correction angle with current reference image; comparing the current reference image to the current frame to determine a change angle; determining a hitch angle in dependence on the offset angle, the change angle and the correction angle; and outputting from the output a signal indicative of the hitch angle.

The method may comprise determining the correction angle by comparing the central reference image to the current reference image to determine a reference angle and calculating the difference between the reference angle and the offset angle.

The method may comprise replacing the current reference image with the current frame when the change angle reaches a predetermined threshold.

The method may comprise determining the change angle and the offset angle at a first predetermined interval and the current angle at a second predetermined interval.

The method may comprise adding, if the correction angle exceeds a predetermined maximum value, a partial correction angle less than or equal to the predetermined maximum value at each of the first predetermined interval until the total correction angle is added.

According to further aspect of the present invention there is provided a non-transitory, computer-readable storage medium storing instructions thereon that when executed by one or more processors causes the one or more processors to carry out the method as described above.

According to further aspect of the present invention there is provided a vehicle which comprises a control system as described above.

The control system may be configured to output video image of the trailer on a display of the vehicle. The control system may be configured to output the steering control signal to an electronic power assisted steering module (EPAS). The control system may be configured to output a speed control signal to control a speed of the vehicle. In this way, the outputted signal indicative of the hitch angle is fed to different systems on the vehicle to aid the user in different manner. This may aid in provision of necessary information to the driver as to the orientation of the trailer relative to the vehicle so that the driver may manually steer the vehicle and/or trailer to avoid situation that could cause the instability or inconvenience in operating of the vehicle and the trailer, such as jack-knifing. Alternatively or in addition, the system of the vehicle may automatically steer the vehicle to avoid such situations. The electronic power assisted steering module may output a signal to automatically steer the vehicle.

The control system may be implemented as a component of a human machine interface (HMI). The display and/or the input device can form part of the HMI. According to a further aspect of the present invention, there is provided a HMI comprising a control system as described herein.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
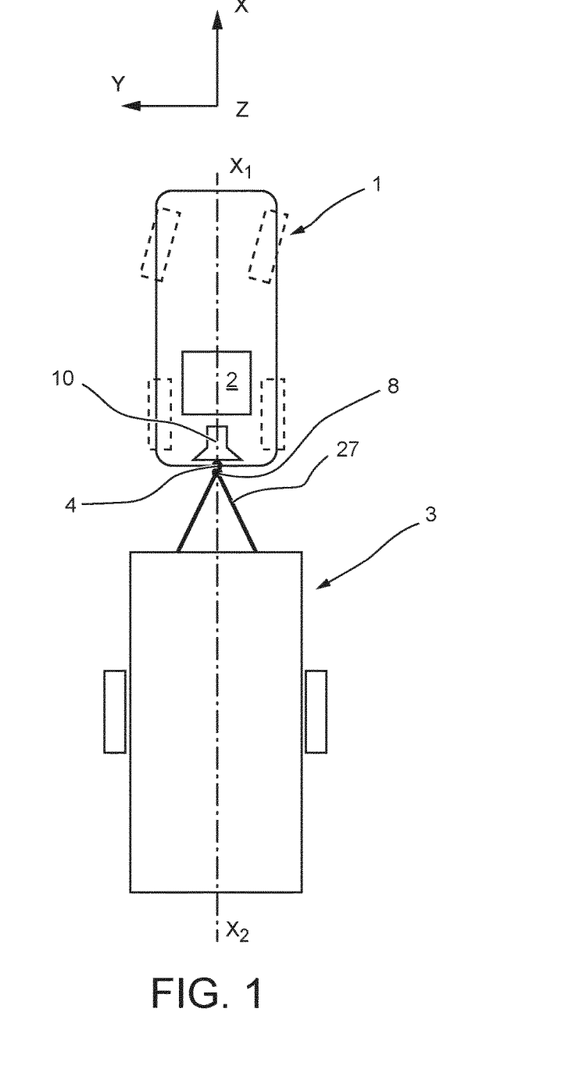
FIG. 1 shows a schematic representation of a vehicle having a control system for monitoring a movement of a trailer connected to the vehicle in accordance with an embodiment of the present invention.

A vehicle 1 incorporating a control system for monitoring a movement of a trailer 3 connected to the vehicle in accordance with an embodiment of the present invention is described herein with reference to the accompanying FIG. 1. The vehicle 1 is connected to a trailer 3, as illustrated in FIG. 1. As described herein, the control system 2 tracks movement of the trailer 3.

The vehicle 1 in the present embodiment is an automobile, but it will be appreciated that the present invention is not limited in this respect. For example, the control system can be incorporated into a tractor unit. Furthermore, the trailer 3 could be a horse trailer, a box trailer, a caravan or any other types of trailers that can be towed. It will be appreciated that the present invention is not limited in this respect.

As shown in FIG. 1, the trailer 3 is pivotally connected to a connector 4. The connector 4 is mounted centrally at the rear of the vehicle 1 coincident with a central longitudinal axis $X_1$ of the vehicle 1. The connector 4 is connected to the hitch coupling 8 of the trailer 3. The hitch coupling 8 of the trailer is mounted centrally at the front of the trailer 3 coincident with a central longitudinal axis $X_2$ of the trailer 3. The connector 4 in the present embodiment is in the form of a hitch ball connector which allows the trailer 3 to pivot about a vertical axis Z. The connector 4 also allows limited rotational movement of the trailer 3 about a longitudinal axis X, and a transverse axis Y. It will be appreciated that the connector 4 could take a variety of forms, for example but not limited to, a towbar ring, a pintle hook, a ball pintle hook, a clevis hitch, a ball and pin towing hitch.

Figure 2:
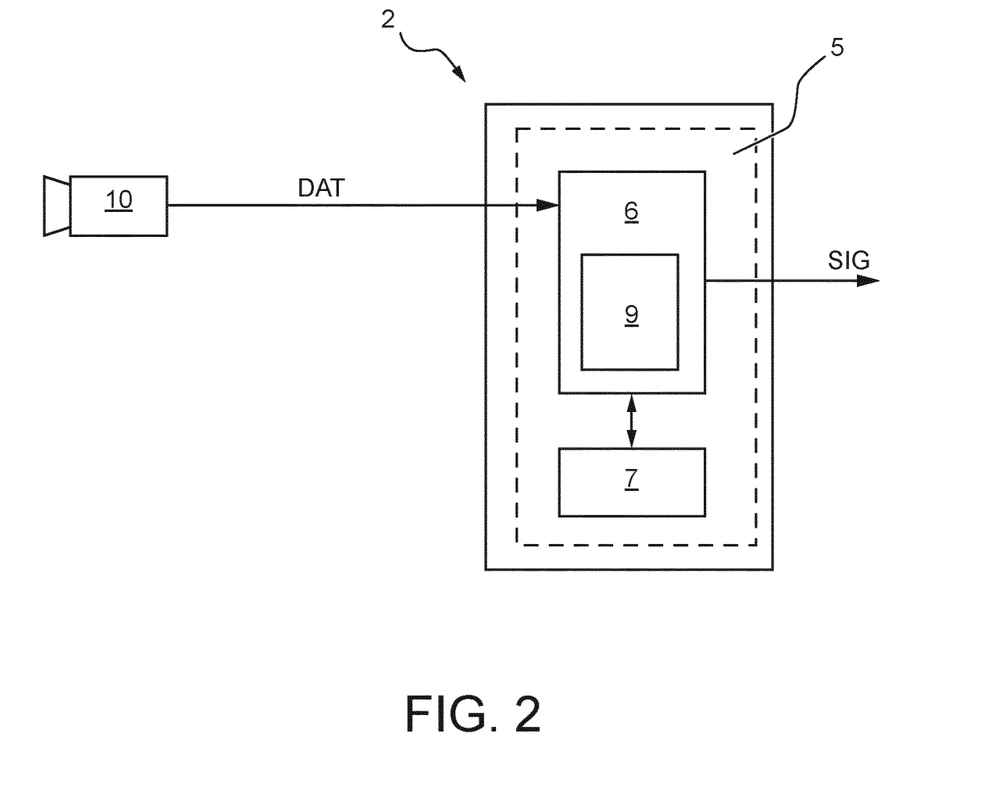
FIG. 2 shows a schematic representation of the control system shown in FIG. 1.
Figure 3:
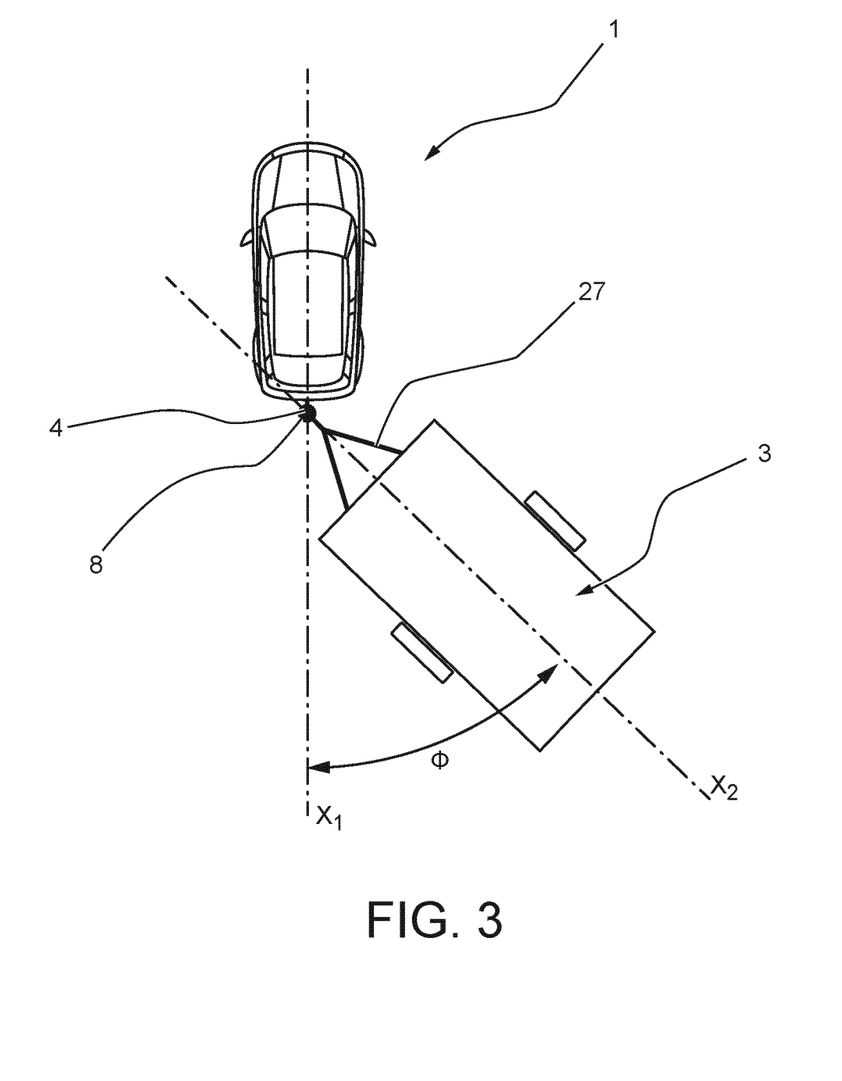
FIG. 3 shows a schematic representation of the vehicle and the trailer in plan-view.

A schematic representation of the control system is shown in FIG. 2. The control system 2 comprises a controller 5 (only one is shown for simplicity of explanation) having one or more electronic processor 6 (only one is shown for simplicity of explanation) and system memory 7 having computer code and/or image data DAT stored thereon. The image data DAT may be stored in a separate memory. The image data DAT may be stored in a buffer. The control system may comprise one or more controllers. The control system may comprise one or more electronic processors. As described herein, the electronic processor 6 is operative to implement an image processing module 9 configured to analyse image data DAT received from an image sensor 10. The image sensor 10 is in the form of an optical camera. The image sensor 10 is rearward facing and is arranged such that its field of view includes a front portion of the trailer 3 (when the trailer 3 is connected to the vehicle 1). The front portion of the trailer 3 comprises an A-frame 27. The A-frame 27 comprises a hitch coupling 8. The shape of the hitch coupling 8 depends on the connector 4 of the vehicle and/or the type of the trailer. The control system 2 of the present invention is applicable regardless of the type of the connector 4 and the trailer 3. The hitch coupling 8 may be formed integral to the trailer 3. The hitch coupling 8 may be an attachable component. The image sensor 10 is operative to provide video image to enable changes in the relative position of the trailer 3 to be determined, as described herein. It will be appreciated that the image sensor 10 could provide additional functions, for example as a parking aid of the vehicle 1.

The image sensor 10 transmits the image data DAT to the electronic processor 6 over a vehicle communication network, such as communication area network (CAN) bus, Flexray, or Ethernet. Alternatively, the image sensor 10 may transmit the image data DAT to the electronic processor 6 using a wireless connection. The image processing module 9 is configured to store the received image data DAT in at least one of the system memory 7, a separate memory or a buffer. The image sensor 10 transmits video data, which forms the image data DAT. The image data DAT comprise frames of images. The term "frame" here refers to the known term in the field of image processing. For example, a frame is a single image in a sequence of images captured by the image sensor 10. The image sensor 10 may, alternatively or in addition, transmit still image which may form the image data DAT. This still image may be considered as a frame of an image.

The image processing module 9 implements an image processing algorithm to track movement of the trailer 3. In particular, the image processing module 9 analyses the image data DAT to identify a set of notable features which can be tracked with respect to time within a frame of image data DAT. Computer vision algorithms such as Features from Accelerated Segment Test (FAST), Binary Robust Independent Elementary Features (BRIEF), KAZE and their variants may be used for finding and identifying notable features within a frame. Fast Library for Approximate Nearest Neighbours (FLANN) algorithm is then used to match the notable features. A transformation is calculated from the two sets of identified features to determine the relative angle of rotation between the two frames in known manner. It will be appreciated that the present invention is not limited in this respect and that different algorithms may be used for identifying notable features and for matching the features between different image frames.

The image processing module 9 is configured to determine whether the received image frame corresponds to a central reference image, a current reference image or a current frame and store the image data accordingly. The central reference image corresponds to a default trailer position relative to the vehicle 1. The central reference image comprises an image of the trailer 3 pivotally connected to a connector 4. The connector 4 is mounted centrally at the rear of the vehicle 1 coincident with a central longitudinal axis $X_1$ of the vehicle 1. As shown in FIG. 1, in the central reference image the central longitudinal axis $X_2$ of the trailer 3 is substantially aligned with the central longitudinal axis $X_1$ of the vehicle 1.

The current reference image corresponds to a frame of image that is selected to be referenced trailer position at a particular interval. The current reference image may correspond to one of the previous current frames. The current reference image is selected in dependence on the current frame meeting certain requirements. For example, as described below, when the change angle reaches a predetermined threshold value, the current frame is selected as the current reference image. The current reference image may be the central reference image.

The current frame corresponds to the received frame image that needs to be analysed at a particular interval. The current frame may be the currently received image frame. The current frame may be a frame of image that was received immediately before the currently received frame image. The current frame is selected in dependence on the configuration of the buffer and the configuration of parallel processing. The buffer may hold one or more image frames for processing. The same current frame may be processed in parallel. Alternating frames may be processed in two parallel threads.

The image processing module 9 is configured to store image data DAT correspond to the central reference image. The image data is a frame of an image. The central reference image may be determined at an initial calibration of the control system 2. The image processing module 9 is configured to take the frame of the image data DAT at the initial calibration stage to be central reference image ensuring that the trailer 3 is connected to the vehicle 1 at an angle such that the central longitudinal axis $X_2$ of the trailer 3 aligns substantially coincidentally with the central longitudinal axis $X_1$ of the vehicle 1. The central reference image comprises the trailer 3 being substantially aligned with the vehicle 1 at the central longitudinal axis $X_1$ of the vehicle 1. During the initial calibration stage the vehicle 1 may be driven at a low speed whilst towing the trailer 3 for a predetermined time. The speed of the vehicle may be approximately 5 mph. The trailer 3 is towed briefly in a straight line, until the image processing module 9 can detect the trailer 3 and determine the orientation of the trailer 3 relative to the vehicle 1. Alternatively, the central reference image may be obtained from a legacy image data. For example, the initial calibration may use an image data DAT obtained when the trailer 3 was previously attached to the vehicle 1 and selected as the central reference image. The central reference image may be the default reference image provided by the control system. For example, the initial calibration may use an original information on the central reference image stored on the vehicle 1 (during manufacturing or software updates) or provided in an external database which is accessible by the vehicle 1.

Figure 4:
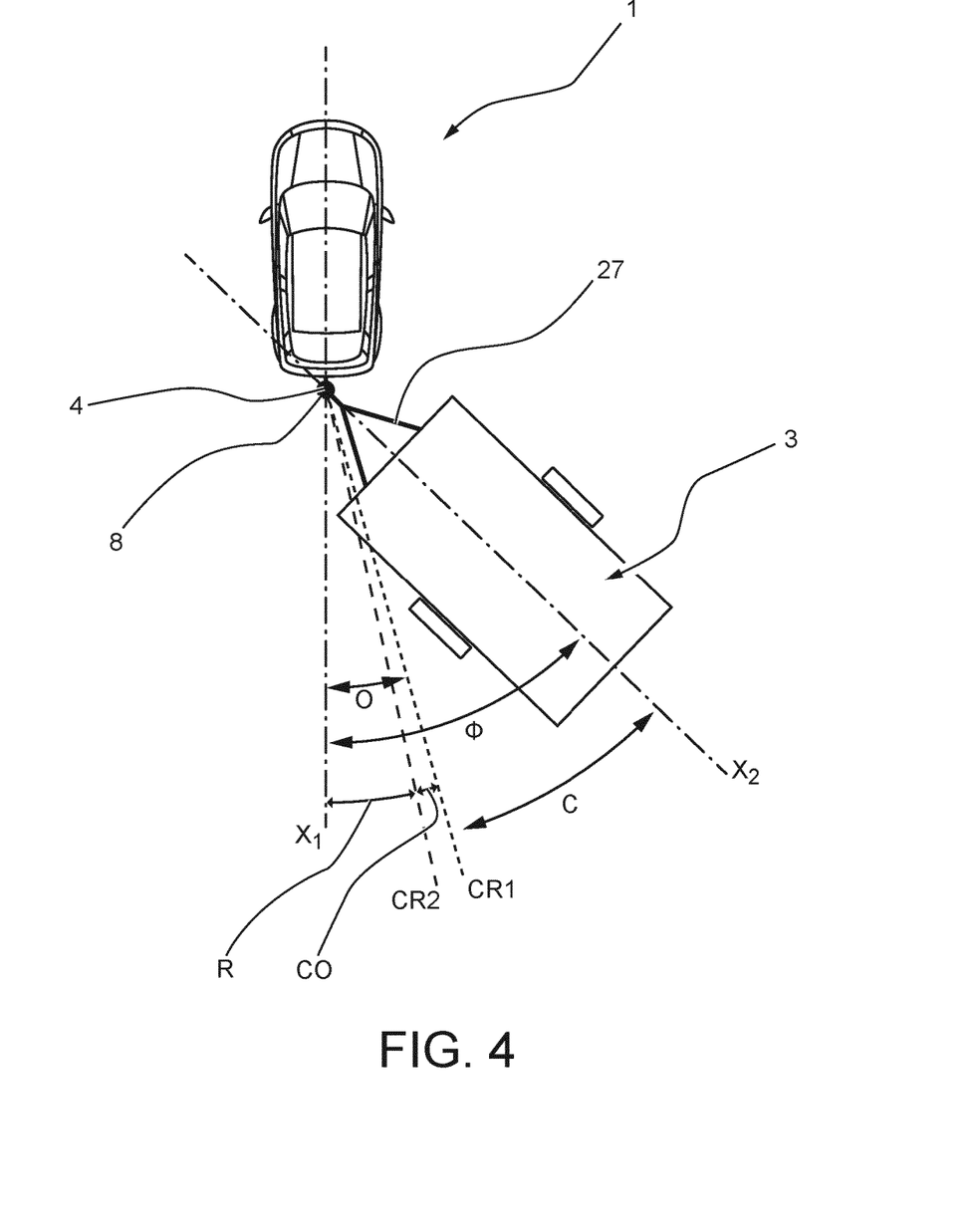
FIG. 4 shows a schematic representation of a vehicle and the trailer showing different angles.

The image processing module 9 is configured to associate an offset angle with the current reference image. The offset angle O is calculated by determining the difference between the central reference image and the current reference image. In FIG. 4, the offset angle O is the angle between the central longitudinal axis $X_1$ of the vehicle 1 and the axis labelled as CR1. The central longitudinal axis $X_1$, of the vehicle 1 is assumed to correspond to the central longitudinal axis $X_2$ of the trailer 3 in the central reference image in this illustration. The axis CR1 corresponds to the calculated central longitudinal axis of the trailer 3 calculated using the current reference image. The angles shown in FIG. 4 are not to the scale, and are shown as one frame of the image for the illustration purpose. The determinations of the preliminary hitch angle (the angle between the central longitudinal axis $X_2$ of the trailer 3 and the central longitudinal axis $X_1$ of the vehicle 1 of each frame) for each of the central reference image, the current reference image and the current frame occur in parallel and in sequence depending on the requirements of replacing relevant frame image. The offset angle may be replaced by the sum of a change angle C of the current frame to the current offset angle.

The image processing module 9 is configured to associate a correction angle CO with the current reference image. The correction angle CO is calculated by determining the difference between the central reference image and the current reference image. The correction angle CO is calculated by determining a reference angle R by comparing the central reference image and the current reference image. The reference angle R is then compared with the offset angle O. The correction angle CO is the difference between the reference angle and the offset angle O. In FIG. 4, the reference angle R is illustrated as the angle between the central longitudinal axis $X_1$ of the vehicle 1 (which is considered the same as the default angle of the trailer 3 in the central reference image in this illustration) and axis CR2, i.e. the angle between the central longitudinal axis $X_2$ of the trailer 3 and the central longitudinal axis $X_1$ of the vehicle 1 of the current reference image. The correction angle CO is the angle between the axis CR1 and axis CR2, or equivalently is the difference between the offset angle O and the reference angle R.

The correction angle CO may be calculated at a half a second interval. Alternatively, or in addition, the correction angle CO is calculated in dependence on the need of the system. For example, the correction angle is calculated after the current reference image is replaced.

The image processing module 9 is configured to determine a change angle C by comparing the current reference image to the current frame. As shown in FIG. 4, the change angle C is the angle between the axis CR1 and the longitudinal axis $X_2$ of the trailer 3 of the current frame. The axis CR1 is derived from the current reference image, and corresponds to the longitudinal axis $X_2$ of the trailer 3 of the current reference image. The current reference image is replaced with the current frame when the change angle C reaches a predetermined threshold. The predetermined threshold is +/−3 degree. If the change angle is big, the difference in the orientation of the trailer 3 relative to the vehicle 1 in different frame images gets bigger. This makes it difficult for the control system 2 to process and monitor the trailer 3. Therefore the predetermined threshold needs to be an acceptable, smaller value. The image processing module 9 may be configured to determine the correction angle CO when the current reference image is replaced.

The image processing module 9 is configured to determine the change angle C at a first predetermined interval and the correction angle CO at a second predetermined interval. The first predetermined interval is shorter than the second predetermined interval. The first predetermined interval may between 15 ms and 30 ms. The change angle C is determined in real-time. The second predetermine interval may be half a second. Contrary to the determination of the change angle C, the correction angle CO may be determined less frequently and does not have to be in real-time with respect to the current frame.

The image processing module 9 is configured to determine the hitch angle ϕ, the change angle C, the offset angle O and the correction angle CO in parallel. Parallel processing by software threading, or hardware separation shortens the calculation period. This also allows the system to be designed in a various manner that can accommodate or prevent any error that may occur.

Different computer vision algorithms are used to select and/or to compare the sets of features from the images to determine the change angle C, the offset angle O and the correction angle CO. The offset angle O and the change angle C are determined by using FAST, BRIEF and FLANN algorithms and the correction angle CO is determined by using KAZE and FLANN algorithms. FAST, BRIEF algorithms are faster and less computationally demanding than the KAZE algorithm, and work relatively well when detecting smaller relative changes of the image data between image frames. The relatively slower algorithm, such as KAZE, provides absolute information between the current frame and the central reference image at lower frequency. KAZE performs better for large rotational changes than the FAST and BRIEF algorithms, but is relatively slow and more computationally demanding. The data output from the slower algorithm, such as the correction angle CO, is used as an error correction and/or a sanity check. The use of the various algorithms with different processing speeds in parallel mitigates the potential inaccuracy cause by accumulation of small inaccuracies in the relative measurements which could become a significant value when calculating in the change angle C, the offset angle O, and eventually the hitch angle φ. Therefore, use of algorithms which require different processing power and results in different processing speed provide a more accurate resultant which is the hitch angle φ. Furthermore, the use of algorithms which require different processing power and results in different processing speed provide more options when designing the system. For example, the system may use different hardware and software arrangements which can eventually save the calculation time, required processing power and costs.

In an embodiment, the image processing module 9 is configured to select a first set of features from the current reference image. The image processing module is configured to select a second set of features from the current frame. The image processing module is configured to select a third set of features from the central reference image. The image processing module is configured to determine the change angle C by comparing the first set of features and the second set of features. The image processing module 9 is configured to determine the correction angle CO by comparing the first set of features and the third set of features.

The image processing module 9 is configured to determine a hitch angle D in dependence on the offset angle O, the change angle C and the correction angle CO and output a signal indicative of the hitch angle SIG. The signal indicative of the hitch angle SIG can be used by other vehicle systems, for example to assist with towing, stability, hitching and manoeuvring. The hitch angle φ is determined by sum of the offset angle O, the change angle C and the correction angle CO. The correction angle CO may exceed a predetermined maximum value that it can apply to derive the hitch angle φ. If the correction angle CO exceeds a predetermined maximum value, the image processing module 9 is configured to add a partial correction angle less than or equal to the predetermined maximum value at each of the first predetermined interval until the total correction angle is added. The predetermined maximum value is 1.5 degree. The total correction angle CO may be capped at 40 degrees.

The system comprises a human machine interface (HMI) module. The HMI module is coupled to a display screen 41 which displays video image from the image sensor 10 (or a composite image derived from the image data from each of the rearward facing image sensor on a vehicle, not shown).

Figure 7:
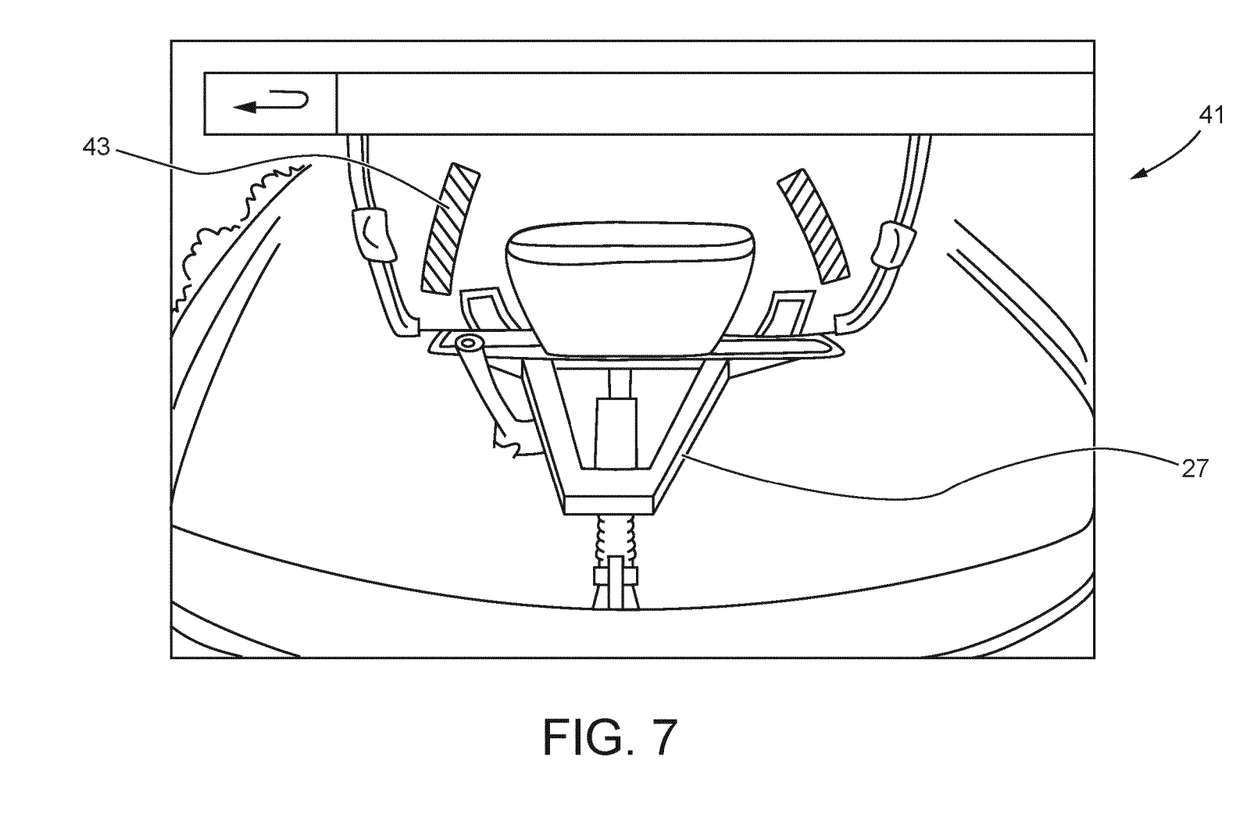
FIG. 7 shows a graphical illustration of a HMI interface of an embodiment of the present invention.

As shown in FIG. 7, the HMI module is configured to overlay graphical symbols 43 over the video image. The graphical symbols 43 comprises current trailer wheels. The graphical symbols may comprise potential trailer wheel position or recommended trailer wheel position and a recommended steering wheel position. The HMI module is configured to display graphical symbols and other useful information that can aid the driver to keep the trailer stable during the journey. The HMI module is also configured to display a graphical representation of the vehicle 1 and the trailer 3 on the display indicating the hitch angle φ.

Figure 5:
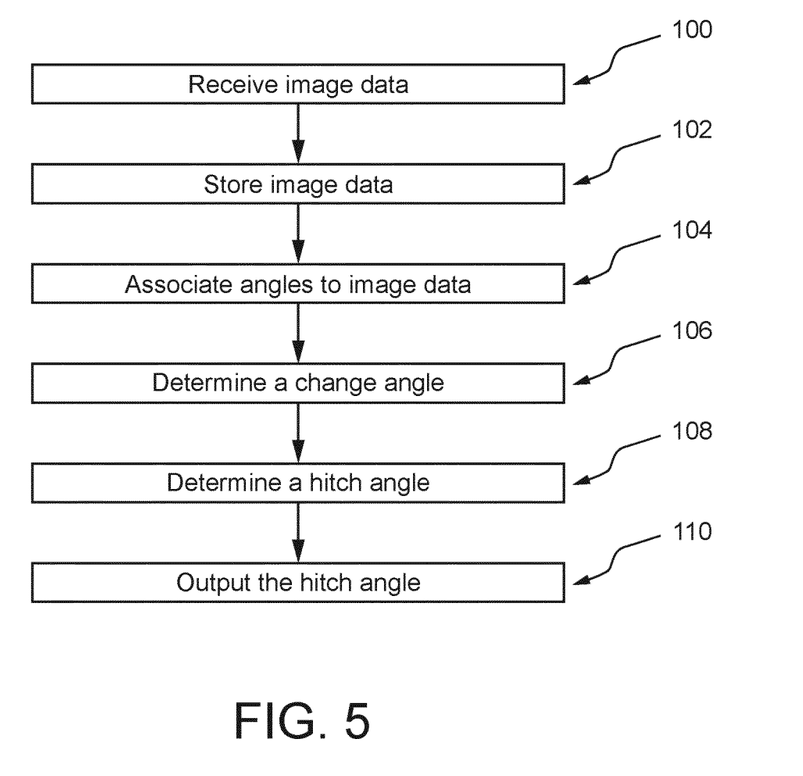
FIG. 5 shows a block diagram illustrating the method of monitoring a movement of a trailer connected to a vehicle in accordance with an embodiment of the present invention.

FIG. 5 shows a flow diagram showing the operation of the control system 2. At step 100 the processor 6 receives the image data signal from an image sensor 10. The image sensor 10 is disposed on the vehicle 1. As mentioned above, the image sensor 10 is facing rearward and captures a video of the trailer 3 connected to the vehicle 1. The image data DAT comprises frames of images. The frame of an image comprises a portion of the trailer 3 so that the position of the trailer 3 relative to the vehicle 1 can be determined.

At step 102 the processor 6 stores image data DAT corresponding to a central reference image, a current reference image and a current frame. The processor 6 may select a first set of features from the current reference image, a second set of features from the current frame and a third set of features from the central reference image. The information relating to the first, second and third sets of the features are stored in the system memory 7, the separate memory or in the buffer and processed.

At step 104 the processor 6 associates an offset angle O with the current reference image and a correction angle CO with current reference image. The processor 6 calculates the offset angle O by determining the difference between the central reference image and the current reference image. The offset angle O may be replaced by the sum of a change angle C of the current frame to the current offset angle. The processor 6 may compare the first set of features and the second set of features to determine the change angle C.

At step 106, the processor 6 determines a change angle C by comparing the current reference image to the current frame. The processor replaces the current reference image with the current frame when the change angle C reaches a predetermined threshold. In this example the predetermined threshold is +/−3 degree.

At step 108, the processor 6 determines a hitch angle φ in dependence on the offset angle O, the change angle C and the correction angle CO and outputs a signal indicative of the hitch angle SIG at step 110.

Figure 6:
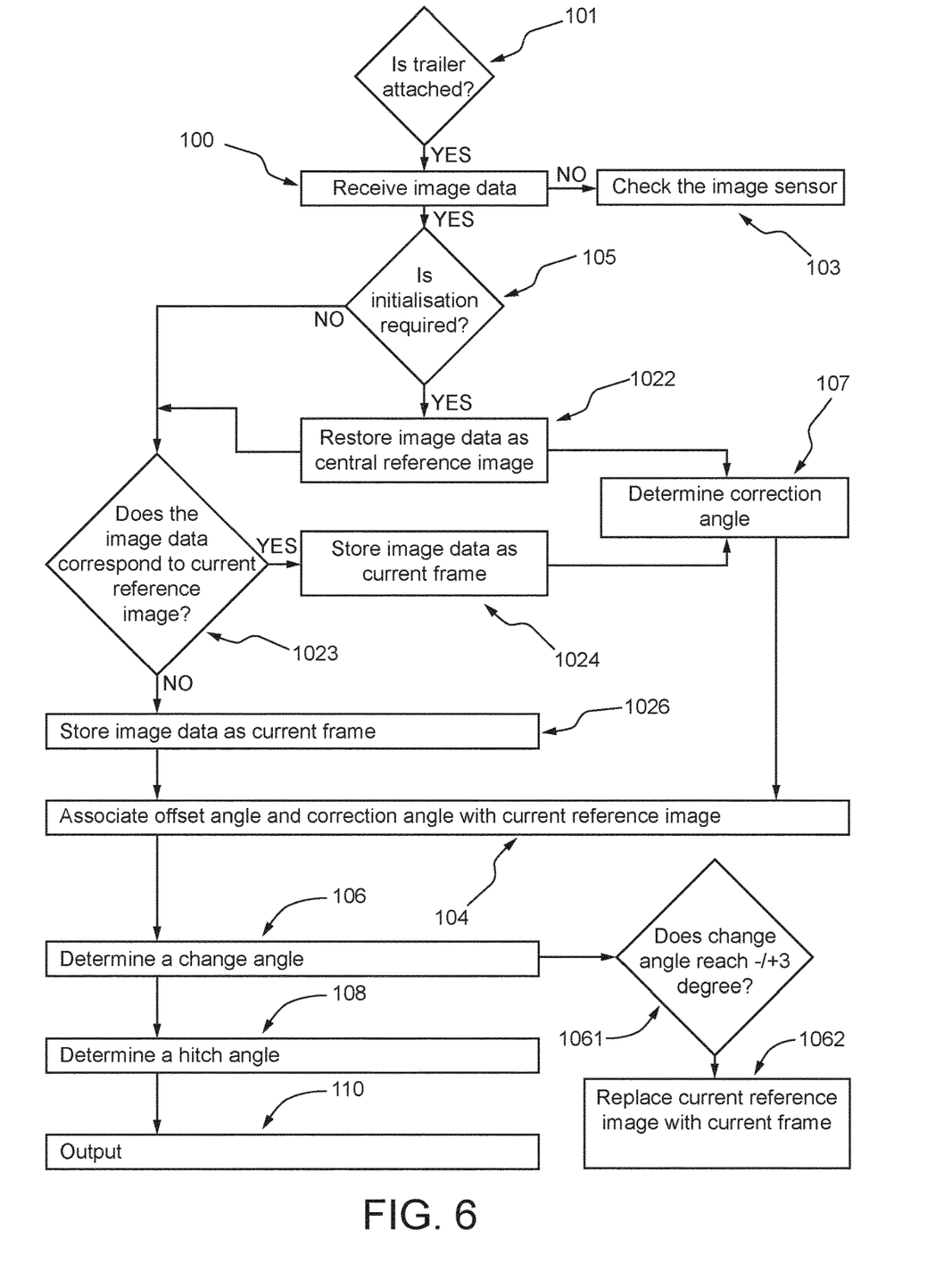
FIG. 6 shows a block diagram illustrating the method in FIG. 5 in further detail.

FIG. 6 shows a further detailed operation of the control system 2. FIG. 6 includes all the steps in FIG. 5. At step 101, the system 2 determines whether a trailer 3 has been attached to the vehicle 1. If the trailer 3 has not been attached the control system 2 does not operate to monitor a movement of a trailer. If the trailer 3 has been attached the system next check whether the image sensor 10 is working. At step 100, the control system 2 receives image data DAT from the image sensor 10. If the control system does not receive any image data, the operability of the image sensor 10 is verified. When the control system 2 receives image data DAT, the control system 2 determines whether initialisation is required (step 105). If the initialisation is required, an initial calibration is performed to determine the central reference image and store the image data DAT corresponds to the central reference image (step 1022). Then, if the image data DAT corresponds to current reference image (step 1023), the image data DAT is stored as current reference image (step 1024). At step 1026 the image data DAT which corresponds to a current frame is stored. By comparing the central reference image to the current reference image a correction angle CO is determined at step 107 and associated with the current reference image at step 104. The processor 6 calculates the correction angle CO by determining the difference between the central reference image and the current reference image. The processor 6 compares the reference angle R with the offset angle O and the difference between the reference angle R and the offset angle O is the correction angle CO. The offset angle O is also associate with the current reference image at step 104. The determination of the correction angle CO and the offset angle O occurs in parallel. The determination of the correction angle CO and the offset angle O occurs at different time intervals. A change angle C is determined by comparing the current reference image to the current frame at step 106. The change angle C is determined at a first predetermined interval and the correction angle CO at a second predetermined interval, where the first predetermined interval is shorter than the second predetermined interval. In this example the first predetermined interval is 30 ms and may be between 15 ms to 30 ms. In this example the second predetermined interval is half a second. At step 1061, if the change angle C reaches a threshold value of +/−3 degrees then the current reference image is replaced with the current frame to provide a new reference image (step 1062), and the change angle C and the current offset angle O added to calculate the new offset angle, which is associated with the new reference image. The correction angle CO may also be determined when the current reference image is replaced (step 107). If the correction angle CO exceeds a predetermined maximum value, a partial correction angle less than or equal to the predetermined maximum value is used to determine the change angle at each of the first predetermined interval until the total correction angle is added by the processor.

At step 108 a hitch angle φ is determined and at step 110 a signal indicative of the hitch angle SIG is outputted. It will be appreciated that the steps of the method may be processed in parallel and in sequence where appropriate to minimise the cost of processing. FIG. 6 shows an embodiment of the method steps, the sequence of the steps may vary in dependence on the design of the system and processing sequence.

It will be appreciated that the use of a correction angle may not be required if, when the reference angle is determined by comparing the current reference frame and the central reference frame, the offset angle is simply set to the reference angle. However, by calculating a separate correction angle as described, if there is a large (or erroneous) change in the reference angle, an abrupt change in the calculated hitch angle is avoided.

Further alternatively, the correction angle may be determined by comparing the current frame and the central reference image.

It will be appreciated that various changes and modifications can be made to the present invention without departing from the scope of the present application.

Aspects of the invention are laid out in the following numbered clauses:

1. A control system for monitoring a movement of a trailer connected to a vehicle, the control system comprising one or more controllers, the control system being configured to:
   receive image data from an image sensor disposed on the vehicle;
   store image data corresponding to a central reference image, a current reference image and a current frame;
   associate an offset angle with the current reference image, and associate a correction angle with the current reference image;
   compare the current reference image to the current frame to determine a change angle;
   determine a hitch angle in dependence on the offset angle, the change angle and the correction angle; and
   output the signal indicative of the hitch angle.

2. The control system of clause 1, wherein the one or more controllers collectively comprise:
   at least one electronic processor having an input for receiving image data; and
   at least one memory device electrically coupled to the at least one electronic processor and having instructions stored therein; and
   wherein the at least one electronic processor is configured to access the at least one memory device and execute the instructions.

3. A control system according to clause 1 or clause 2, wherein the control system is configured to:
   determine the correction angle by comparing the central reference image to the current reference image to determine a reference angle and calculating the difference between the reference angle and the offset angle.

4. A control system according to any one of preceding clauses, wherein the control system is configured to perform an initial calibration to determine the central reference image.

5. A control system according to any one of preceding clauses, wherein the current reference image is replaced with the current frame when the change angle reaches a predetermined threshold.

6. A control system according to clause 5 wherein the predetermined threshold is +/−3 degrees.

7. A control system according to clause 5 or clause 6, wherein the offset angle is replaced by the sum of the change angle of the current frame to the current offset angle.

8. A control system according to any one of preceding clauses, wherein the control system is configured to determine the change angle at a first predetermined interval and the correction angle at a second predetermined interval.

9. A control system according to clause 8, wherein the first predetermined interval is shorter than the second predetermined interval.

10. A control system according to clause 8 or clause 9, wherein the first predetermined interval is 30 ms.

11. A control system according to clauses 8 to 10, wherein the second predetermined interval is half a second.

12. A control system according to any one of preceding clauses, wherein the control system is configured to determine the correction angle when the current reference image is replaced.

13. A control system according to any one of preceding clauses, wherein if the correction angle exceeds a predetermined maximum value, the control system is configured to add a partial correction angle less than or equal to the predetermined maximum value at each of the first predetermined interval until the total correction angle is added.

14. A control system according to clause 13, wherein the predetermined maximum value is 1.5 degree.

15. A control system according to any one of preceding clauses, wherein computer vision algorithms for selecting and/or for comparing sets of features from the images to determine the change angle, the offset angle and the correction angle are different.

16. A control system according to any one of preceding clauses, wherein computer vision algorithms FAST and BRIEF are used to determine the change angle and the offset angle and KAZE is used to determine the correction angle.

17. A control system according to any one of preceding clauses, wherein the control system is configured to:
select a first set of features from the current reference image, a second set of features from the current frame, a third set of features from the central reference image;
determine the change angle by comparing the first set of features and the second set of features; and
determine the correction angle by comparing the first set of features and the third set of features.

18. A method of monitoring a movement of a trailer connected to a vehicle, the control method comprising:
receiving image data from an image sensor disposed on the vehicle;
storing image data corresponding to a central reference image, a current reference image and a current frame;
associating an offset angle with the current reference image, and associating a correction angle with current reference image;
comparing the current reference image to the current frame to determine a change angle;
determining a hitch angle in dependence on the offset angle, the change angle and the correction angle; and
outputting from the output a signal indicative of the hitch angle.

19. A method according to clause 18, comprising:
determining the correction angle by comparing the central reference image to the current reference image to determine a reference angle and calculating the difference between the reference angle and the offset angle.

20. A method according to clause 18 or clause 19, comprising replacing the current reference image with the current frame when the change angle reaches a predetermined threshold.

21. A method according to clauses 18 to 20, comprising determining the change angle and the offset angle at a first predetermined interval and the correction angle at a second predetermined interval.

22. A method according to clauses 18 to 21, comprising adding, if the correction angle exceeds a predetermined maximum value, a partial correction angle less than or equal to the predetermined maximum value at each of the first predetermined interval until the total correction angle is added.

23. Computer software that, when executed, is arranged to perform a method according to clauses 18 to 22.

24. A non-transitory, computer-readable storage medium storing instructions thereon that, when executed by one or more electronic processors, causes the one or more electronic processors to carry out the method of clauses 18 to 22.

25. A vehicle comprising a control system according to any one of clauses 1 to 18.

The invention claimed is:

1. A control system for monitoring a movement of a trailer connected to a vehicle, the control system comprising at least one controller, the control system being configured to:
receive image data from an image sensor disposed on the vehicle;
store image data corresponding to a central reference image, a current reference image and a current frame;
determine a current offset angle associated with the current reference image, by comparing the central reference image with the current reference image;
compare the current reference image to the current frame to determine a change angle;
replace the current reference image with a new current reference image corresponding to the current frame when the change angle reaches a predetermined threshold;
determine a new offset angle associated with the new current reference image by summing the change angle and the current offset angle;
determine a non-zero reference angle by comparing the central reference image to the new current reference image;
determine a non-zero correction angle by calculating a difference between the reference angle and the new offset angle;
determine a hitch angle in dependence on the new offset angle, the change angle and the correction angle; and
output a signal indicative of the hitch angle.

2. The control system of claim 1, wherein the at least one controller comprises:
at least one electronic processor having an input for receiving the image data; and
at least one memory device electrically coupled to the at least one electronic processor and having instructions stored therein; and
wherein the at least one electronic processor is configured to access the at least one memory device and execute the instructions.

3. The control system as claimed in claim 1, wherein the control system is configured to perform an initial calibration to determine the central reference image.

4. The control system as claimed in claim 1 wherein the predetermined threshold is +/−3 degrees.

5. The control system as claimed in claim 1, wherein the control system is configured to determine the change angle at a first predetermined interval and the correction angle at a second predetermined interval.

6. The control system as claimed in claim 5, wherein the first predetermined interval is shorter than the second predetermined interval.

7. The control system as claimed in claim 5, wherein the first predetermined interval is 30 ms.

8. The control system as claimed in claim 5, wherein the second predetermined interval is half a second.

9. The control system as claimed in claim 5, wherein if the correction angle exceeds a predetermined maximum value, the control system is configured to add a partial correction angle less than or equal to the predetermined maximum value at each of the first predetermined interval until the correction angle has been added.

10. The control system as claimed in claim 1, wherein the control system is configured to determine the correction angle when the current reference image is replaced.

11. The control system as claimed in claim 1 wherein different computer vision algorithms are used for selecting and/or for comparing sets of features from the images to determine the change angle, the current offset angle, the new offset angle and the correction angle.

12. The control system as claimed in claim 1, wherein computer vision algorithms Features from Accelerated Segment Test (FAST) and Binary Robust Independent Elementary Features (BRIEF) are used to determine the change angle, the current offset angle and the new offset angle and KAZE is used to determine the correction angle.

13. The control system as claimed in claim 1, wherein the control system is configured to:
select a first set of features from the current reference image,
select a second set of features from the current frame, select a third set of features from the central reference image, determine the change angle by comparing the first set of features and the second set of features, and determine the correction angle by comparing the first set of features and the third set of features.

14. The vehicle comprising the control system according to claim 1.

15. A method of monitoring a movement of a trailer connected to a vehicle, the method comprising:

receiving image data from an image sensor disposed on the vehicle;

storing image data corresponding to a central reference image, a current reference image and a current frame;

determining a current offset angle associated with the current reference image, by comparing the central reference image with the current reference image;

comparing the current reference image to the current frame to determine a change angle;

replacing the current reference image with a new current reference image corresponding to the current frame when the change angle reaches a predetermined threshold;

determining a new offset angle associated with the new current reference image by summing the change angle and the current offset angle;

determining a non-zero reference angle by comparing the central reference image to the new current reference image;

determining a non-zero correction angle by calculating a difference between the reference angle and the new offset angle;

determining a hitch angle in dependence on the new offset angle, the change angle and the correction angle; and outputting a signal indicative of the hitch angle.

16. A non-transitory, computer-readable storage medium storing instructions thereon that, when executed by one or more electronic processors, causes the one or more electronic processors to carry out the method of claim 15.

* * * * *